May 4, 1965 K. BÖKE 3,181,304

PELTIER DEVICE EMPLOYING SEMI-CONDUCTOR BODIES WHICH ARE CONNECTED TO ONE ANOTHER BY MEANS OF INTERPOSED MEMBERS OF SATISFACTORY ELECTRICAL AND THERMAL CONDUCTIVITY

Filed Jan. 24, 1964

INVENTOR.
KLAUS BÖKE

BY

Frank R. Jufois

AGENT 3,181,304

PELTIER DEVICE EMPLOYING SEMI-CONDUCTOR BODIES WHICH ARE CONNECTED TO ONE ANOTHER BY MEANS OF INTERPOSED MEMBERS OF SATISFACTORY ELECTRICAL AND THERMAL CONDUCTIVITY

Klaus Böke, Brand, Germany, assignor to North American Philips Company, Inc., New York, N.Y., a corporation of Delaware Filed Jan. 24, 1964, Ser. No. 339,914
Claims priority, application Germany, Jan. 31, 1963, P 31,044
5 Claims. (Cl. 62—3)

The invention relates to a Peltier device employing semiconductor bodies which are connected to one another by electrically and thermally conductive members which in order to dissipate the thermal energy produced at the contact faces with the semiconductor bodies are provided with dissipating members.

Figure 1:
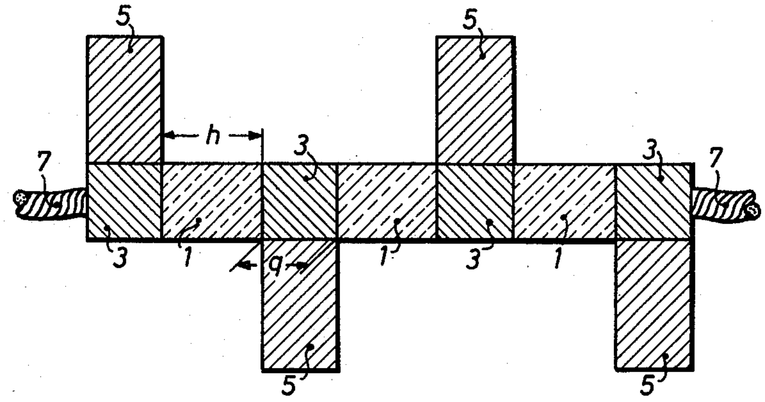
Fig.1 PRIOR ART
Figure 2:
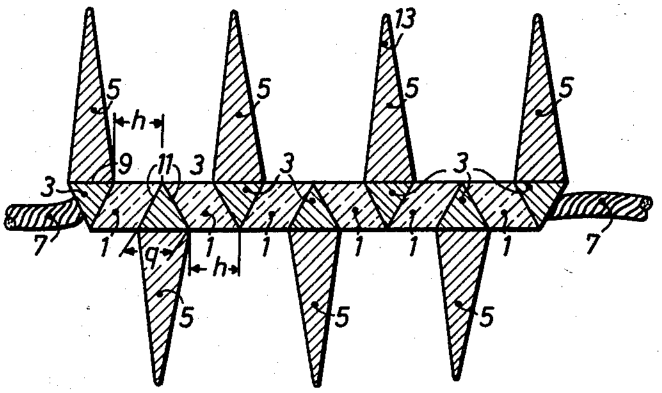

Reference is made to the accompanying drawing wherein FIG. 1 is a longitudinal cross-sectional view of a Peltier device typical of the prior art, and FIG. 2 is a similar view of a device in accordance with the invention.

As FIG. 1 shows, Peltier refrigerating devices generally comprise semi-conductor bodies 1 between which metallic connecting members 3 are soldered. In order to dissipate the thermal energy, dissipating members, such as metal fins 5 or metal plates, are joined to the connecting members which are preferably made of copper. Part of the dimensions of a Peltier device of the said structure is determined by the current to be passed through the device and the cross-sectional area of the semi-conductor bodies. Thus, the height $h$ must not be less than a predetermined value and at the areas at which the connecting members protrude from the surface of the semi-conductor bodies the cross-sectional areas $q$ of the said members must be so large that the thermal energy produced can be completely absorbed and dissipated by the dissipating members joined to the connecting members at these areas. Consequently, in the conventional Peltier devices owing to the predetermined heigh $h$ and to the required cross-sectional area $q$ the length of the entire device cannot readily be reduced.

In a Peltier device employing semi-conductor bodies which are connected to one another by interposed members of electrical and thermal conductivity, which in order to dissipate the thermal energy produced at the areas of contact with the semi-conductor bodies are provided with dissipating members, this disadvantage is obviated in that according to the invention the contact faces of the connecting members converge from one surface of the semi-conductor bodies to the opposite surface.

This structure of the connecting members is made possible by the fact that the thermal energies to be dissipated from the various parts of the connecting members are not equal to one another. If, as is common practice, a connecting member dissipates its thermal energy at one side from the device, it has to absorb little thermal energy at the side of the device opposite the dissipating side. From this area, however, the proportion of thermal energy to be dissipated gradually increases towards the associated dissipating member and hence the cross section of the connecting member must be correspondingly increased beyond this area. The amount of thermal energy to be dissipated finally reaches a maximum at the face to which the associated dissipating member is joined. Consequently the thermal conditions in the connecting members enable the contact faces at the side of the device opposite the associated dissipating side to be approximated to one another in a degree such as nearly to come into contact with one another. If, as is usual in such structures, the members absorbing thermal energy are arranged at one side of the Peltier device and the members dissipating thermal energy are arranged at the opposite side of the device, the successive contact faces of the various semi-conductor bodies are always inclined to one another in pairs. Hence, the height of the semi-conductor bodies remains constant in spite of the triangular shape of the connecting members. Due to the fact, however, that owing to the reduced cross-sectional area of each connecting member the semi-conductor bodies extend into the spaces otherwise occupied by the connecting members, the length of the entire device is considerably reduced.

In a suitable further embodiment of the invention the dissipating members in the form of fins are also triangular, since the thermal energy produced at their free ends is no longer equal to that produced at the areas at which they are joined to the connecting members. This permits a saving of material.

It is known to shape semi-conductor bodies into triangular forms. However, this triangular shape is used only to vary the area of contact between the hot and the cold contacts. Consequently, this shape does not result in a reduced length.

It is also known to shape the cooling fins into tapered forms at least in the immediate proximity of the areas of contact with the semi-conductor body in an insulating sealing-in member. This tapering shape, however, is obviously chosen only because the cooling fins for dissipating the thermal energy produced must not have the cross-sectional area required at the contact faces.

In another known device, the cross-sectional areas of the cooling fins even increase starting from their attachments to the connecting members 3. This structure, however, does not increase the dissipating effect and consequently is unsuitable.

In order that the invention may readily be carried into effect, an embodiment thereof will now be described by way of example with reference to FIG. 2 which is a longitudinal sectional view of a device in accordance with the invention provided with triangularly shaped cooling members.

Similar to the device of FIG. 1, the Peltier device of FIG. 2 comprises semi-conductor bodies 1 between which connecting members 3 are soldered. Fins 5 dissipating thermal energy are joined to the connecting members. The ends of the device are soldered to current-supply leads 7.

The connecting members 3 soldered between the semi-conductor bodies 1 taper off from the areas 9 at which the fins are joined to them towards the opposite surface of the semi-conductor members. Consequently the contact faces 11 between the semi-conductor bodies 1 and the connecting members 3 converge to one another and almost touch one another at the surface of the semi-conductor bodies remote from the junction with the fins. In the region in which the contact surfaces 11 approach one another most closely, the production of the thermal energy is comparatively slight. In contrast therewith, at the areas of the fin attachments 9 the production of thermal energy is a maximum and hence at these areas 9 the cross-sectional areas of the connecting members 10 and of the cooling fins joined thereto are greatest.

The fins 5 evenly dissipate thermal energy between the ends at which they are joined to the connecting members and their free ends 5, so that within the cooling fins 5 a considerably smaller amount of thermal energy is to be dissipated at the free ends than at the joining areas 9. Hence the fins 5 are tapering off starting from the areas of attachment 9.

Obviously it is not absolutely necessary for the thermal energy to be dissipated with the aid of fins 5. These fins 5 may appropriately be replaced by continuous plates of known structure.

What is claimed is:

1. A Peltier device comprising a plurality of spaced thermoelectric semiconductor elements, a plurality of electrically and thermally conductive members each interposed between and connecting together adjacent semiconductor elements, means for passing current through the assembly of semiconductor elements and connecting members whereby one major surface of the assembly absorbs heat and the opposite major surface dissipates heat, alternate ones of said connecting members having a similarly oriented, generally triangular cross-section whereby the surfaces thereof connected to the adjacent semiconductor elements converge from said one major surface to the said opposite major surface, the connecting members intervening between the alternating members also having a generally triangular cross-section but oriented in the opposite direction whereby the surfaces thereof connected to the adjacent semiconductor elements converge from said opposite major surface to the said one major surface.

2. A device as set forth in claim 1 wherein the semiconductor elements have a rhomboidal cross-section.

3. A Peltier device comprising a plurality of spaced, aligned, thermoelectric semiconductor elements, a plurality of electrically and thermally conductive members each interposed between and connecting together adjacent semiconductor elements, means for passing current through the assembly of semiconductor elements and connecting members in series whereby one major surface of the assembly absorbs heat and the opposite major surface dissipates heat, alternate ones of said connecting members having a similarly oriented, generally triangular cross-section whereby the surfaces thereof connected to the adjacent semiconductor elements converge from said one major surface to the said opposite major surface, the connecting members intervening between the alternating members also having a generally triangular cross-section but oriented in the opposite direction whereby the surfaces thereof connected to the adjacent semiconductor elements converge from said opposite major surface to the said one major surface, and plural heat-dissipating members each connected to one of the connecting members at its wide end.

4. A device as set forth in claim 3 wherein said heat-dissipating members constitute cooling fins tapering down from their junction with the connecting members to their extremities.

5. A device as set forth in claim 3 wherein the converging surfaces of the connecting members nearly touch one another at their narrow end.

References Cited by the Examiner

UNITED STATES PATENTS

| | | | |
|---|---|---|---|
| 2,881,594 | 4/59 | Hopkins | 62—3 |
| 3,090,206 | 5/63 | Anders | 62—3 |
| 3,100,969 | 8/63 | Elfving | 62—3 |

FOREIGN PATENTS

| | | |
|---|---|---|
| 606,783 | 10/60 | Canada. |

OTHER REFERENCES

Schneider: German printed application No. 1,126,427, March 1962.

ROBERT A. O'LEARY, *Primary Examiner.*

WILLIAM J. WYE, *Examiner.*